United States Patent
Huang

(10) Patent No.: US 10,019,101 B2
(45) Date of Patent: Jul. 10, 2018

(54) TOUCH-SENSING DISPLAY PANEL MODULE WHICH IMPROVES SENSING ABILITY USING RESET UNIT AND READOUT UNIT AND RELATED DRIVING METHOD

(71) Applicant: AU Optronics Corp., Hsin-Chu (TW)

(72) Inventor: Hsueh-Ying Huang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 184 days.

(21) Appl. No.: 14/943,033

(22) Filed: Nov. 17, 2015

(65) Prior Publication Data
US 2016/0070411 A1 Mar. 10, 2016

Related U.S. Application Data

(63) Continuation of application No. 13/775,258, filed on Feb. 25, 2013, now Pat. No. 9,223,432.

(30) Foreign Application Priority Data

Jun. 22, 2012 (TW) .............................. 101122421 A

(51) Int. Cl.
*G06F 3/041* (2006.01)

(52) U.S. Cl.
CPC .......... *G06F 3/0416* (2013.01); *G06F 3/0412* (2013.01); *G06F 2203/04103* (2013.01)

(58) Field of Classification Search
CPC ................. G06F 3/0416; G06F 3/0412; G06F 2203/04103
USPC ......................................................... 345/173
See application file for complete search history.

(56) References Cited

U.S. PATENT DOCUMENTS

| | | |
|---|---|---|
| 2010/0039406 A1 | 2/2010 | Lee |
| 2012/0050220 A1 | 3/2012 | Liu |
| 2014/0008520 A1* | 1/2014 | Raynor ............ H01L 27/14612 250/208.1 |

* cited by examiner

*Primary Examiner* — Jonathan Blancha
(74) *Attorney, Agent, or Firm* — Tim Tingkang Xia, Esq.; Locke Lord LLP

(57) ABSTRACT

An embedded sensor of a touch panel includes at least a readout unit and a reset unit. The total readout length or the total reset length during each sensing period may be larger than the pixel refresh period by introducing other readout units, introducing other reset units, or increasing the enabling period of the gate driving signals, thereby enhancing the sensibility of the touch panel.

14 Claims, 7 Drawing Sheets

TOUCH-SENSING DISPLAY PANEL MODULE WHICH IMPROVES SENSING ABILITY USING RESET UNIT AND READOUT UNIT AND RELATED DRIVING METHOD

CROSS REFERENCE TO RELATED APPLICATIONS

This application is a continuation application of U.S. application Ser. No. 13/775,258, filed Feb. 25, 2013.

BACKGROUND OF THE INVENTION

1. Field of the Invention

The present invention is related to a touch-sensing display panel module and related driving method, and more particularly, to a touch-sensing display panel module and related driving method which increase pixel charge time or reset time.

2. Description of the Prior Art

Touch-sensing display panels have been widely used in electronic products such as personal digital assistants (PDAs), mobile phones, notebook computers or personal computers. Touch-sensing display panels can provide a more intuitive interface between the user and the electronic device by receiving touch commands. With rapid shrinkage in size, there is less room for traditional input devices such as keyboards or mice. Therefore, touch-sensing panels providing tactile inputs and display function have become more and more popular.

According to structure designs, there are two major types of touch-sensing display panels: out-cell type and in-cell type. In an out-cell type touch-sensing display panel, a touch-sensing panel and a display panel are manufactured separately and then attached to each other in subsequent process. In an in-cell type touch-sensing display panel, touch-sensing array and signal readout lines are disposed directly on an inner surface of a substrate in the display panel. In-cell type touch-sensing display panels have become the mainstream products due to thin appearance, high transmittance and low manufacturing costs In a prior art in-cell type touch-sensing display panel, a sensing unit is integrated into a thin film transistor (TFT) array. In other word, a pixel of the in-cell type touch-sensing display panel includes the sensing unit for detecting touch command and the TFT for displaying images according to various driving signals and detecting signals. A prior art sensing unit typically includes a readout TFT switch and a reset TFT switch. When applied to a small-sized panel, signal readout and voltage reset may easily be achieved since there is sufficient time for switching the TFTs. When applied to a large-sized touch panel, RC delay may result in insufficient signal readout time and voltage reset time, thereby influencing the sensing ability of the touch-sensing display panel.

SUMMARY OF THE INVENTION

An embodiment of the present invention provides a touch-sensing display panel module including a plurality of pixels; a plurality of gate lines respectively coupled to the pixels and arranged to provide a plurality of gate control signals for controlling a refresh operation of the plurality of pixels; a plurality of data lines respectively coupled to the pixels for providing pixel voltages; and a sensing unit. The sensing unit includes a signal readout line; a storage unit coupled to a detecting node; a readout unit coupled between the detecting node and the signal readout line, wherein the signal readout line is arranged to receive a voltage level of the detecting node via the readout unit; and a reset unit coupled to the detecting node and arranged to reset the storage unit. The signal readout line is arranged to receive the voltage level of the detecting node via the readout unit and reset the storage unit using the reset unit during a sensing period, and a reset time of the storage unit during the sensing period is larger than a refresh period of each pixel.

An embodiment of the present invention also provides touch-sensing display panel module including a plurality of pixels; a plurality of gate lines respectively coupled to the pixels and arranged to provide a plurality of gate control signals for controlling a refresh operation of the plurality of pixels; a plurality of data lines respectively coupled to the pixels for providing pixel voltages; and a first sensing unit. The first sensing unit includes a first signal readout line; a first storage unit coupled to a first detecting node; a first readout unit coupled between the first detecting node and the first signal readout line and coupled to a first gate line among the plurality of gate lines, and configured to control the first signal readout line to receive a voltage level of the first detecting node according to a gate control signal provided by the first gate line; and a first reset unit coupled to the first detecting node and a second gate line among the plurality of gate lines and arranged to reset the first storage unit according to a gate control signal provided by the second gate line. Each gate line is arranged to provide a gate control signal whose enable period is completely or partially overlapped with an enable period provided by at least another gate line; and an enable period of the gate control signal provided by the first gate line is not overlapped with an enable period of the gate control signal provided by the second gate line.

An embodiment of the present invention also provides a method for driving a touch-sensing display panel module. The method includes refreshing a first row of pixels and controlling a sensing unit according to a first gate control signal during a first period for allowing a first signal readout line to receive a sensing signal from the sensing unit; refreshing a second row of pixels and resetting the sensing unit according to a second gate control signal during a second period subsequent to the first period; refreshing a third row of pixels and resetting the sensing unit according to a third gate control signal during the second period; and refreshing the first row of pixels again and controlling the signal readout line to receive the sensing signal from the sensing unit according to a fourth gate control signal during a third period subsequent to the second period.

An embodiment of the present invention also provides a method for driving a touch-sensing display panel module. The method includes refreshing a first row of pixels according to a first gate control signal and controlling a first signal readout line according to a sensing scan line during a first period for receiving a sensing signal from a first sensing unit; refreshing a second row of pixels according to a second gate control signal during a second period which is completely or partially overlapped with the first period; refreshing a third row of pixels according to a third gate control signal and controlling the first sensing unit according to the third gate control signal during a third period subsequent to the second period for resetting the first sensing unit On the aforementioned embodiment, the first gate control signal may be arranged to control the signal readout line for receiving the sensing signal from the first sensing unit. The method for driving a touch-sensing display panel module may further comprise: the second gate control signal is arranged to control a second sensing unit for allowing a second signal readout line to receive a sensing signal from the second sensing unit, wherein the first period and the second period are completely overlapped; refreshing a fourth row of pixels according to a fourth gate control signal and controlling the second sensing unit according to the fourth gate control signal during the second period for resetting the second sensing unit; providing pixel voltages to the first and second rows of pixels simultaneously via the plurality of data lines during the second period; and providing pixel voltages to the third and fourth rows of pixels simultaneously via the plurality of data lines during the third period.

An embodiment of the present invention also provides a method for driving a touch-sensing display panel module. The method includes refreshing a first row of pixels and controlling a sensing unit according to a first gate control signal during a first period for allowing a signal readout line to receive a sensing signal from the sensing unit; refreshing a second row of pixels and controlling the sensing unit according to a second gate control signal during the first period for allowing a signal readout line to receive the sensing signal from the sensing unit; refreshing a third row of pixels and resetting the sensing unit according to a third gate control signal during a second period subsequent to the first period; refreshing the fourth row of pixels again and controlling the signal readout line to receive the sensing signal from the sensing unit according to a fourth gate control signal during a third period subsequent to the second period.

On the aforementioned embodiment, the method for driving a touch-sensing display panel module may further comprise: the sensing unit providing the sensing signal via a storage unit; controlling a first transistor of the sensing unit according to the first gate control signal during the first period for receiving the sensing signal by coupling the signal readout line to the storage unit; controlling a second transistor of the sensing unit according to the second gate control signal during the first period for receiving the sensing signal by coupling the signal readout line to the storage unit; and controlling a third transistor of the sensing unit according to the third gate control signal during the second period for resetting the storage unit.

These and other objectives of the present invention will no doubt become obvious to those of ordinary skill in the art after reading the following detailed description of the preferred embodiment that is illustrated in the various figures and drawings.

DETAILED DESCRIPTION

FIGS. 1-6 are diagrams illustrating the structure and operation of touch-sensing display panel modules 101-106 according to embodiments of the present invention. Each of the touch-sensing display panel module 101-106 includes a plurality of pixels PX, a plurality of data lines $DL_1$-$DL_M$, and a plurality of gate lines $GL_1$-$GL_N$ (M and N are positive integers). Each pixel PX is coupled to a corresponding data line and a corresponding gate line. The data lines $DL_1$-$DL_M$ are arranged to transmit pixel voltages to each column of pixels. The gate lines $GL_1$-$GL_N$ are arranged to control the refreshing of each row of pixels. The touch-sensing display panel modules 101-106 include sensing units 11-16, respectively, for determining if a touch event occurs by performing signal readout and voltage reset during a sensing period.

Figure 1:
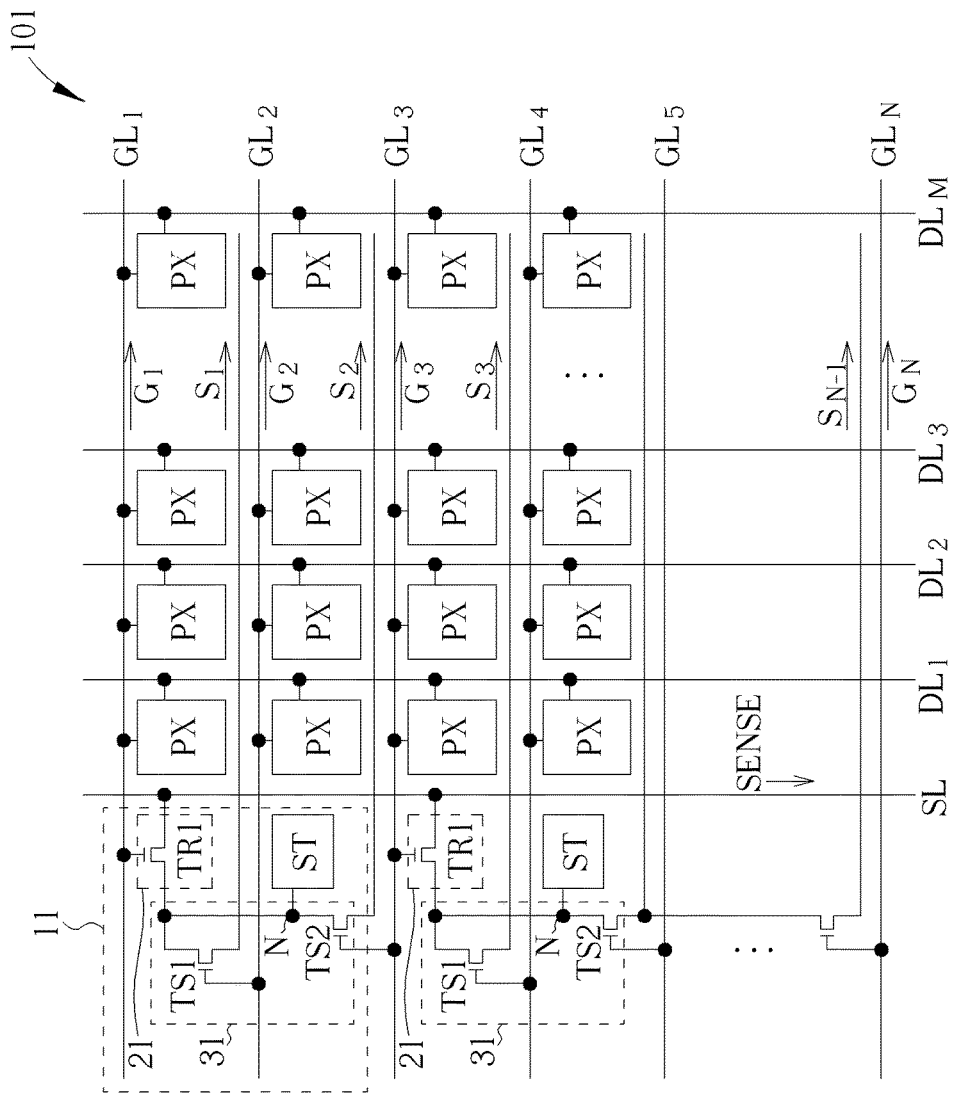
FIGS. 1-6 are diagrams illustrating the structure and operation of touch-sensing display panel modules according to embodiments of the present invention.
Figure 1:
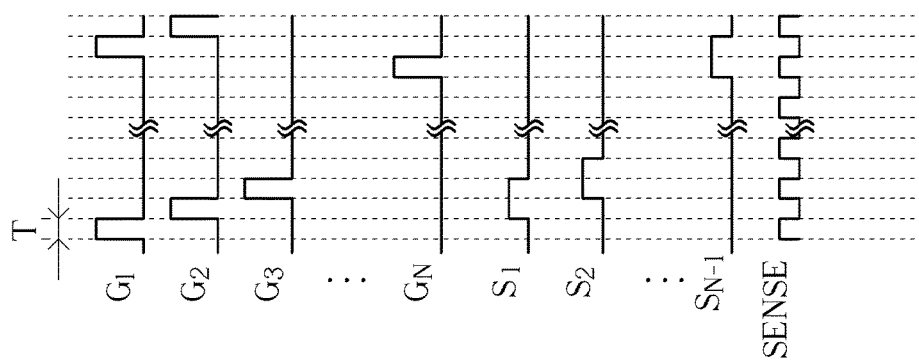

In the embodiment demonstrated on the right side of FIG. 1, each sensing unit 11 includes a signal readout line SL, a storage unit ST, a readout unit 21, and a reset unit 31. Each storage unit ST is coupled to a detecting node N for storing the voltage level of the detecting node N. Each readout unit 21 includes a transistor TR1 having a first end coupled to the signal readout line SL, a second end coupled to the detecting node N, and a control end coupled to a corresponding gate line $GL_i$ among the gate lines $GL_1$-$GL_N$ (i is an integer between 1 and N). Each reset unit 31 includes transistors TS1 and TS2: the transistor TS1 includes a first end coupled to the detecting node N, a second end for receiving a reset signal $S_i$, and a control end coupled to a corresponding gate line $GL_{i+1}$ among the gate lines $GL_1$-$GL_N$; the transistor TS2 includes a first end coupled to the detecting node N, a second end for receiving a reset signal $S_{i+1}$, and a control end coupled to a corresponding gate line $GL_{i+2}$ among the gate lines $GL_1$-$GL_N$. The signal readout line SL is arranged to receive the voltage level of the detecting node N via the readout unit 21 and transmit a corresponding sensing signal SENSE. Before a sensing period ends, the reset unit 31 is configured to reset the voltage level of the storage unit ST, which may thus perform signal readout operation during the next sensing period by storing the voltage level of the detecting node N.

On the left side of FIG. 1 is a timing diagram illustrating the operation of the touch-sensing display panel module 101. Gate control signals $G_1$-$G_N$ are provided for activating and refreshing the pixels coupled to the gate lines $GL_1$-$GL_N$ sequentially. During the enable period of the gate control signal $G_i$, the signal readout line SL may receive the voltage level of the detecting node N via the transistor TR1, and the reset unit 31 may reset the corresponding storage unit ST via the transistor TS2. During the enable period of the gate control signal $G_{i+1}$, the reset unit 31 may reset the corresponding storage unit ST via the transistor TS1. For example, for the transistor TR1 whose gate is coupled to the gate line $GL_1$, the signal readout line SL is arranged to receive the voltage level of the detecting node N via the transistor TR1 during the enable period of the gate control signal $G_1$; the transistor TS1 whose gate is coupled to the gate line $GL_2$ is arranged to reset the corresponding storage unit ST during the enable period of the gate control signal $G_2$; for the transistors TR1 and TS2 whose gates are coupled to the gate line $GL_3$, the signal readout line SL is arranged to receive the voltage level of the detecting node N via the transistor TR1 during the enable period of the gate control signal $G_3$, and the transistor TS2 is arranged to reset the corresponding storage unit ST during the enable period of the gate control signal $G_3$; and the readout units 21 and the reset units 31 coupled to other gate lines may operate in the same manner as described above. Therefore, during a sensing period of the touch-sensing display panel module 101 according to the first embodiment of the present invention, the sensing unit 11 is configured to perform one signal readout operation and two voltage reset operations. With T representing the refresh period of each pixel, a signal readout time T is required for the signal readout line SL to receive the voltage level of the detecting node N via the readout unit 21 each time and for the reset unit 31 to reset the corresponding storage unit ST each time. Therefore, during each sensing period of the touch-sensing display panel module 101, the overall readout time is T and the overall reset time is 2T.

Figure 2:
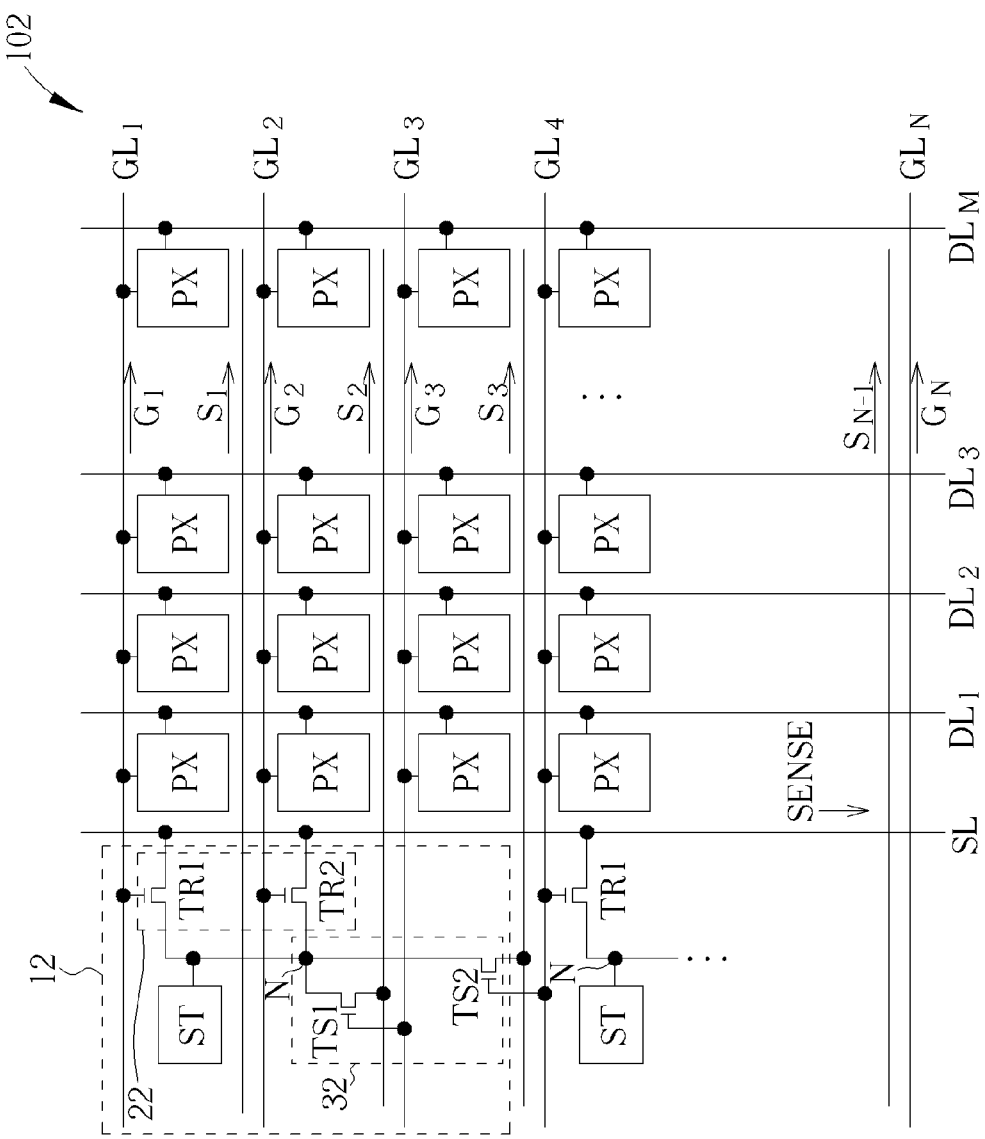
Figure 2:
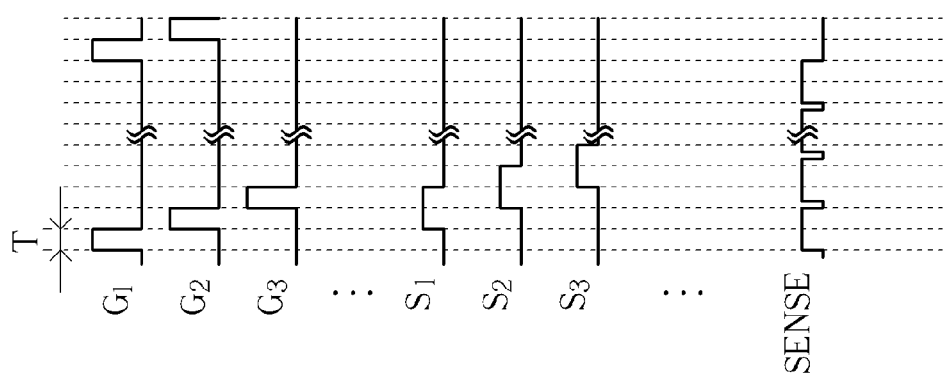

In the embodiment demonstrated on the right side of FIG. 2, each sensing unit 12 includes a signal readout line SL, a storage unit ST, a readout unit 22, and a reset unit 32. Each storage unit ST is coupled to a detecting node N for storing the voltage level of the detecting node N. Each readout unit 22 includes transistors TR1 and TR2: the transistor TR1 includes a first end coupled to the signal readout line SL, a second end coupled to the detecting node N, and a control end coupled to a corresponding gate line $GL_i$ among the gate lines $GL_1$-$GL_N$ (i is an integer between 1 and N); the transistor TR2 includes a first end coupled to the signal readout line SL, a second end coupled to the detecting node N, and a control end coupled to a corresponding gate line $GL_{i+1}$ among the gate lines $GL_1$-$GL_N$. Each reset unit 32 includes transistors TS1 and TS2: the transistor TS1 includes a first end coupled to the detecting node N, a second end for receiving a reset signal $S_{i+1}$, and a control end coupled to a corresponding gate line $GL_{i+2}$ among the gate lines $GL_1$-$GL_N$; the transistor TS2 includes a first end coupled to the detecting node N, a second end for receiving a reset signal $S_{i+2}$, and a control end coupled to a corresponding gate line $GL_{i+3}$ among the gate lines $GL_1$-$GL_N$. The signal readout line SL is arranged to receive the voltage level of the detecting node N via the readout unit 22 and transmit a corresponding sensing signal SENSE. Before a sensing period ends, the reset unit 32 is configured to reset the voltage level of the storage unit ST, which may thus perform signal readout operation during the next sensing period by storing the voltage level of the detecting node N.

On the left side of FIG. 2 is a timing diagram illustrating the operation of the touch-sensing display panel module 102. Gate control signals $G_1$-$G_N$ are provided for activating and refreshing the pixels coupled to the gate lines $GL_1$-$GL_N$ sequentially. During the enable period of the gate control signal $G_i$, the signal readout line SL may receive the voltage level of the detecting node N via the transistor TR1, and the reset unit 32 may reset the corresponding storage unit ST via the transistor TS2. During the enable period of the gate control signal $G_{i+1}$, the signal readout line SL may receive the voltage level of the detecting node N via the transistor TR2. During the enable period of the gate control signal $G_{i+2}$, the reset unit 32 may reset the corresponding storage unit ST via the transistor TS1. For example, for the transistor TR1 whose gate is coupled to the gate line $GL_1$, the signal readout line SL is arranged to receive the voltage level of the detecting node N via the transistor TR1 during the enable period of the gate control signal $G_1$; for the transistor TR2 whose gate is coupled to the gate line $GL_2$, the signal readout line SL is arranged to receive the voltage level of the detecting node N via the transistor TR2 during the enable period of the gate control signal $G_2$; the transistor TS1 whose gate is coupled to the gate line $GL_3$ is arranged to reset the corresponding storage unit ST during the enable period of the gate control signal $G_3$; for the transistors TS2 and TR1 whose gates are coupled to the gate line $GL_4$, the signal readout line SL is arranged to receive the voltage level of the detecting node N via the transistor TR1 during the enable period of the gate control signal $G_4$, and the transistor TS2 is arranged to reset the corresponding storage unit ST during the enable period of the gate control signal $G_4$; and the readout units 22 and the reset units 32 coupled to other gate lines may operate in the same manner as described above. Therefore, during a sensing period of the touch-sensing display panel module 102 according to the second embodiment of the present invention, the sensing unit 12 is configured to perform two signal readout operations and two voltage reset operations. With T representing the refresh period of each pixel, a signal readout time T is required for the signal readout line SL to receive the voltage level of the detecting node N via the readout unit 22 each time and for the reset unit 32 to reset the corresponding storage unit ST each time. Therefore, during each sensing period of the touch-sensing display panel module 102, the overall readout time is 2T and the overall reset time is 2T.

Figure 3:
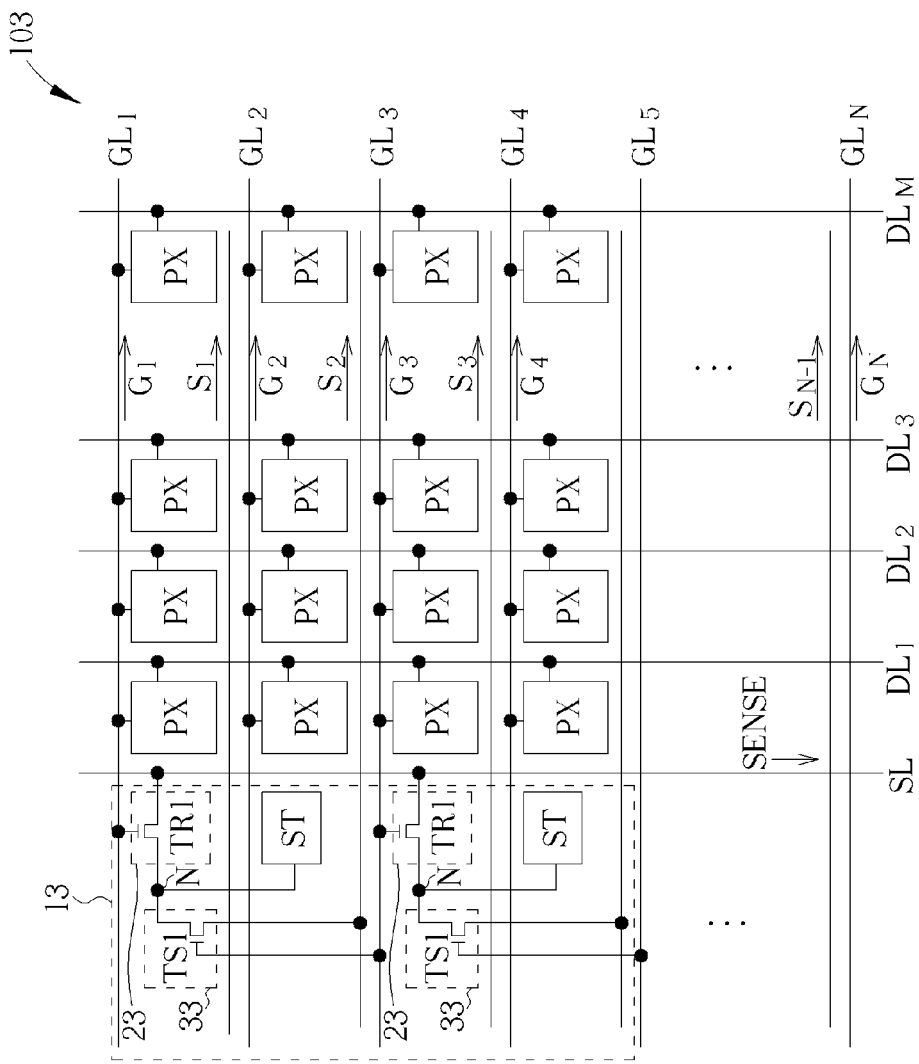
Figure 3:
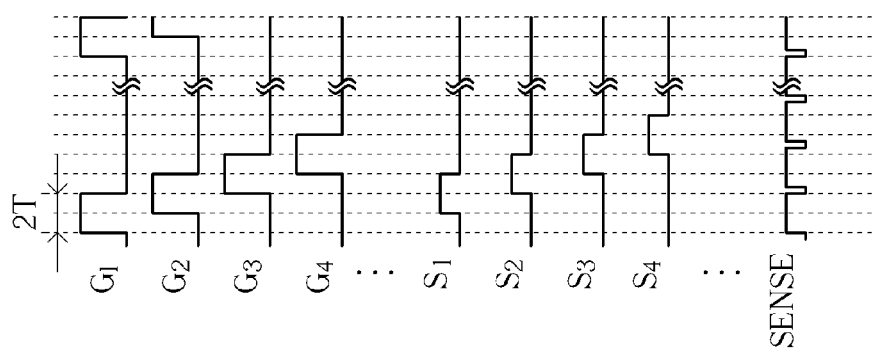

In the embodiment demonstrated on the right side of FIG. 3, each sensing unit 13 includes a signal readout line SL, a storage unit ST, a readout unit 23, and a reset unit 33. Each storage unit ST is coupled to a detecting node N for storing the voltage level of the detecting node N. Each readout unit 23 includes a transistor TR1 having a first end coupled to the signal readout line SL, a second end coupled to the detecting node N, and a control end coupled to a corresponding gate line $GL_i$ among the gate lines $GL_1$-$GL_N$ (i is an integer between 1 and N). Each reset unit 33 includes a transistor TS1 having a first end coupled to the detecting node N, a second end for receiving a reset signal $S_{i+1}$, and a control end coupled to a corresponding gate line $GL_{i+2}$ among the gate lines $GL_1$-$GL_N$. The signal readout line SL is arranged to receive the voltage level of the detecting node N via the readout unit 23 and transmit a corresponding sensing signal SENSE. Before a sensing period ends, the reset unit 33 is configured to reset the voltage level of the storage unit ST, which may thus perform signal readout operation during the next sensing period by storing the voltage level of the detecting node N.

On the left side of FIG. 3 is a timing diagram illustrating the operation of the touch-sensing display panel module 103. Gate control signals $G_1$-$G_N$ are provided for activating and refreshing the pixels coupled to the gate lines $GL_1$-$GL_N$ sequentially. The enable period of each gate control signal is larger than a pixel refresh period T (the duration each time a pixel is being refreshed). The enable period of each gate control signal is overlapped with the enable period of at least another gate control signal, and the overlapped enable period is equal to or larger than T. During the enable period of the gate control signal $G_i$, the signal readout line SL may receive the voltage level of the detecting node N via the transistor TR1. During the enable period of the gate control signal $G_{i+2}$, the signal readout line SL may receive the voltage level of the detecting node N via the transistor TR1, and the reset unit 33 may reset the corresponding storage unit ST via the transistor TS1. For example, for the transistor TR1 whose gate is coupled to the gate line $GL_1$, the signal readout line SL is arranged to receive the voltage level of the detecting node N via the transistor TR1 during the enable period of the gate control signal $G_1$; for the transistors TR1 and TS1 whose gates are coupled to the gate line $GL_3$, the signal readout line SL is arranged to receive the voltage level of the detecting node N via the transistor TR1 during the enable period of the gate control signal $G_3$, and the transistor TS1 is arranged to reset the corresponding storage unit ST during the enable period of the gate control signal $G_3$; and the readout units 23 and the reset units 33 coupled to other gate lines may operate in the same manner as described above. Therefore, during a sensing period of the touch-sensing display panel module 103 according to the third embodiment of the present invention, the sensing unit 13 is configured to perform one signal readout operation and one voltage reset operation. The overall readout time and the overall reset time may be larger than T (such as 2T).

Figure 4:
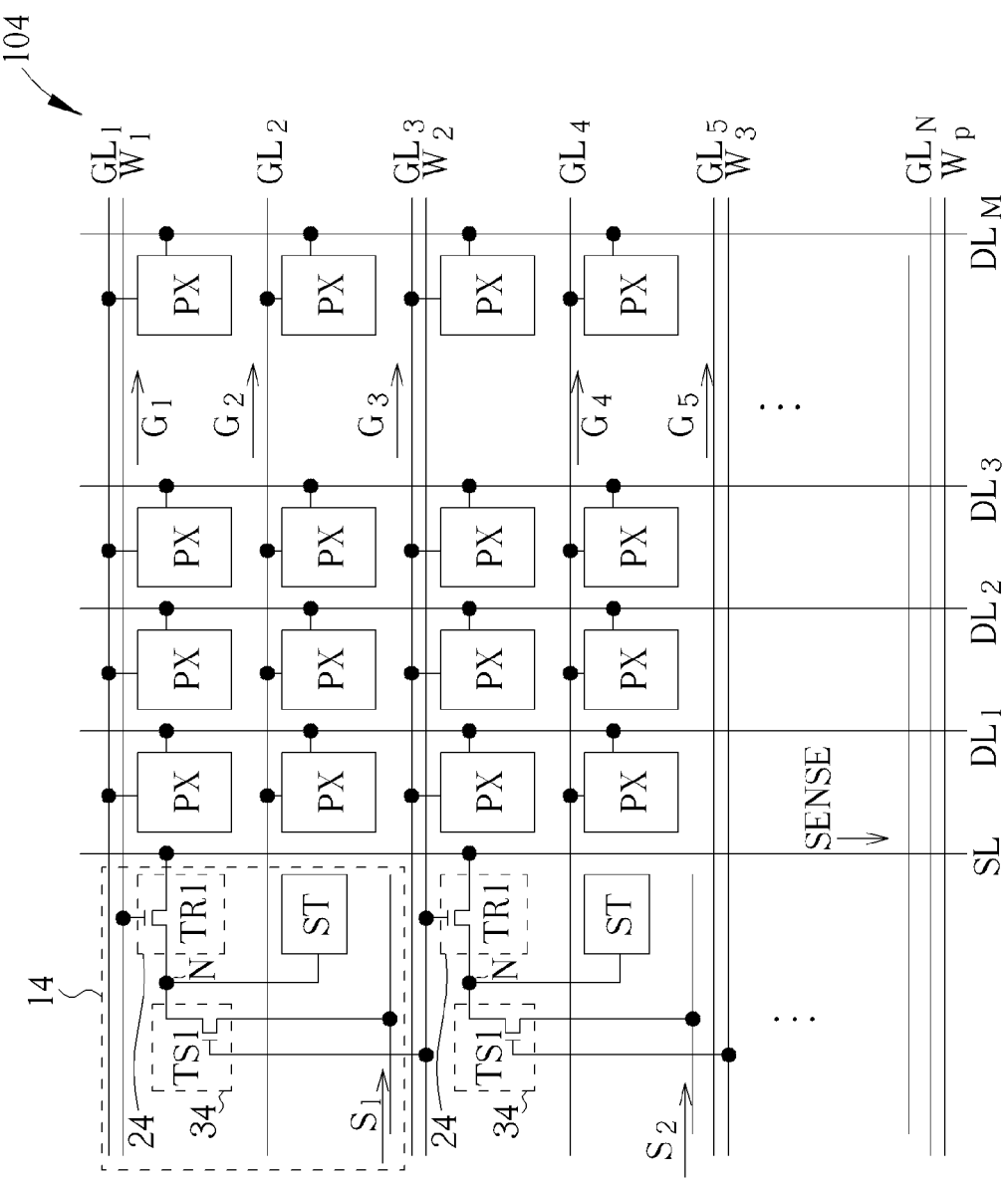
Figure 4:
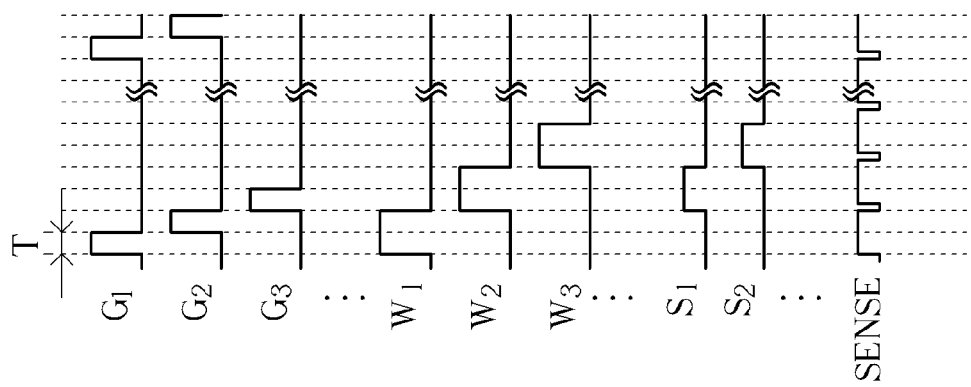

In the embodiment demonstrated on the right side of FIG. 4, each sensing unit 14 includes a signal readout line SL, a sensing scan line (one of $W_l$-$W_P$, P is a positive integer), a storage unit ST, a readout unit 24, and a reset unit 34. Each storage unit ST is coupled to a detecting node N for storing the voltage level of the detecting node N. Each readout unit 24 includes a transistor TR1 having a first end coupled to the signal readout line SL, a second end coupled to the detecting node N, and a control end coupled to a corresponding sensing scan line $W_j$ (j is an integer between 1 and P). Each reset unit 34 includes a transistor TS1 having a first end coupled to the detecting node N, a second end for receiving a reset signal $S_j$, and a control end coupled to a corresponding gate line $GL_i$ among the gate lines $GL_1$-$GL_N$. The signal readout line SL is arranged to receive the voltage level of the detecting node N via the readout unit 24 and transmit a corresponding sensing signal SENSE. Before a sensing period ends, the reset unit 34 is configured to reset the voltage level of the storage unit ST, which may thus perform signal readout operation during the next sensing period by storing the voltage level of the detecting node N.

On the left side of FIG. 4 is a timing diagram illustrating the operation of the touch-sensing display panel module 104. Gate control signals $G_1$-$G_N$ are provided for activating and refreshing the pixels coupled to the gate lines $GL_1$-$GL_N$ sequentially. The enable period of each gate control signal is equal to a pixel refresh period T (the duration each time a pixel is being refreshed) and is not overlapped with the enable period of any other gate control signal. The enable period of each sensing scan line is equal to or larger than the pixel refresh period T and is not overlapped with the enable period of any other sensing scan line. During the enable period of the sensing scan line $W_j$, the signal readout line SL may receive the voltage level of the detecting node N via the transistor TR1. During the enable period of the gate control signal $G_i$, the reset unit 34 may reset the corresponding storage unit ST via the transistor TS1. For example, for the transistor TR1 whose gate is coupled to the sensing scan line $W_1$, the signal readout line SL is arranged to receive the voltage level of the detecting node N via the transistor TR1 during the enable period of the sensing scan line $W_1$; for the transistors TR1 and TS1 whose gates are coupled to the sensing scan line $W_2$, the signal readout line SL is arranged to receive the voltage level of the detecting node N via the transistor TR1 during the enable period of the sensing scan line $W_2$, and the transistor TS1 is arranged to reset the corresponding storage unit ST during the enable period of the sensing scan line $W_2$; and the readout units 24 and the reset units 34 coupled to other sensing scan lines may operate in the same manner as described above. Therefore, during a sensing period of the touch-sensing display panel module 104 according to the fourth embodiment of the present invention, the sensing unit 14 is configured to perform one signal readout operation and one voltage reset operation. The overall readout time may be larger than T (such as 2T).

Figure 5:
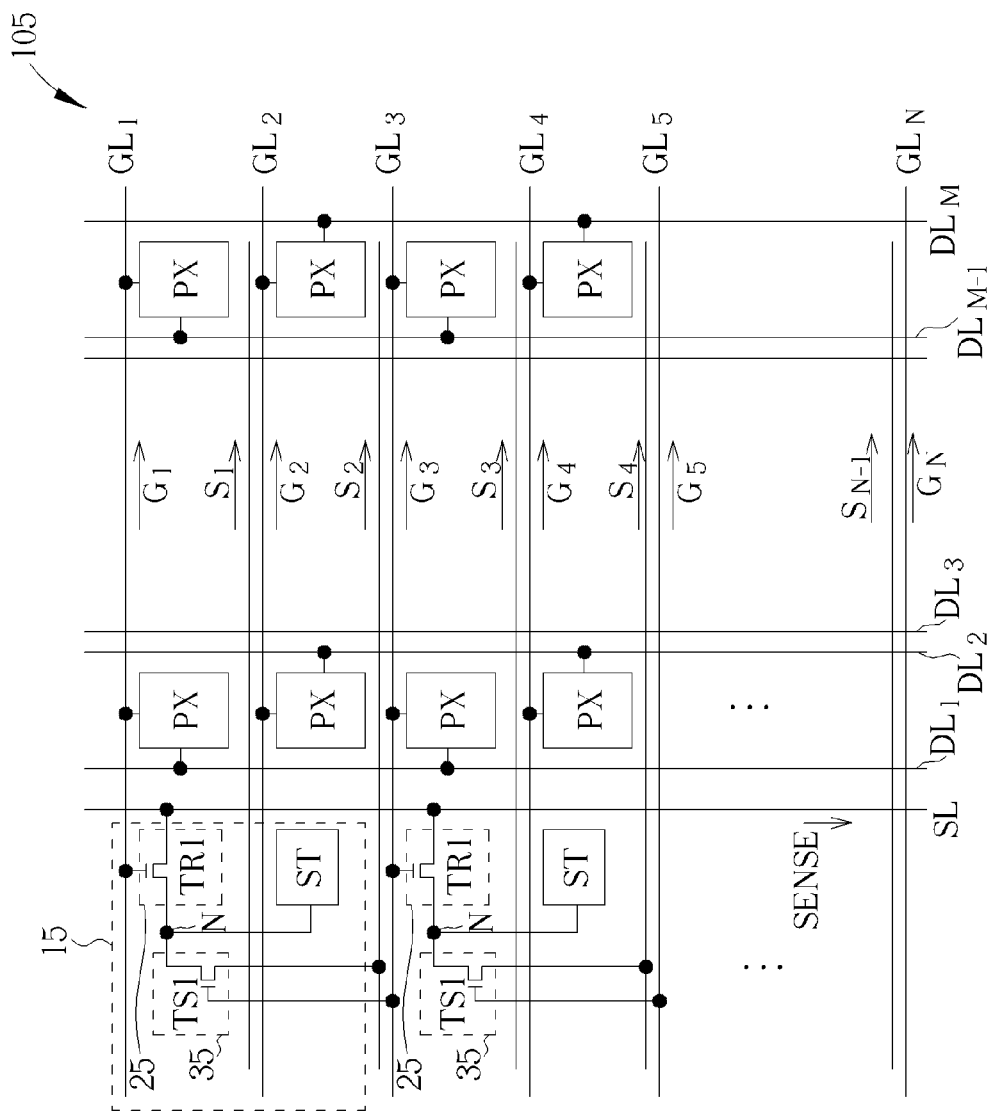
Figure 5:
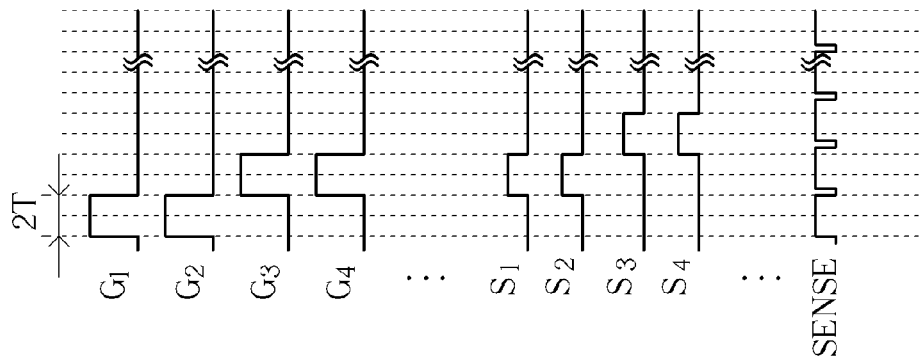

In the embodiment demonstrated on the right side of FIG. 5, each sensing unit 15 includes a signal readout line SL, a storage unit ST, a readout unit 25, and a reset unit 35. Each storage unit ST is coupled to a detecting node N for storing the voltage level of the detecting node N. Each readout unit 25 includes a transistor TR1 having a first end coupled to the signal readout line SL, a second end coupled to the detecting node N, and a control end coupled to a corresponding gate line $GL_i$ among the gate lines $GL_1$-$GL_N$ (i is an integer between 1 and N). Each reset unit 35 includes a transistor TS1 having a first end coupled to the detecting node N, a second end for receiving a reset signal $S_{i+1}$, and a control end coupled to a corresponding gate line $GL_{i+2}$ among the gate lines $GL_1$-$GL_N$. The signal readout line SL is arranged to receive the voltage level of the detecting node N via the readout unit 25 and transmit a corresponding sensing signal SENSE. Before a sensing period ends, the reset unit 35 is configured to reset the voltage level of the storage unit ST, which may thus perform signal readout operation during the next sensing period by storing the voltage level of the detecting node N.

On the left side of FIG. 5 is a timing diagram illustrating the operation of the touch-sensing display panel module 105. Gate control signals $G_1$-$G_N$ are provided for activating and refreshing the pixels coupled to the gate lines $GL_1$-$GL_N$ sequentially. The enable period of each gate control signal is larger than a pixel refresh period T (the duration each time a pixel is being refreshed). The enable period of each gate control signal is completely overlapped with the enable period of at least another gate control signal. Therefore, when the pixel voltage is provided via a data line, at least two gate control signals are during the enable period. During the enable period of the gate control signal $G_i$, the signal readout line SL may receive the voltage level of the detecting node N via the transistor TR1, and the reset unit 35 may reset the corresponding storage unit ST via the transistor TS1. For example, for the transistor TR1 whose gate is coupled to the gate line $GL_1$, the signal readout line SL is arranged to receive the voltage level of the detecting node N via the transistor TR1 during the enable period of the gate control signal $G_1$; for the transistors TR1 and TS1 whose gates are coupled to the gate line $GL_3$, the signal readout line SL is arranged to receive the voltage level of the detecting node N via the transistor TR1 during the enable period of the gate control signal $G_3$, and the transistor TS1 is arranged to reset the corresponding storage unit ST during the enable period of the gate control signal $G_3$; and the readout units 25 and the reset units 35 coupled to other gate lines may operate in the same manner as described above. Therefore, during a sensing period of the touch-sensing display panel module 105 according to the third embodiment of the present invention, the sensing unit 15 is configured to perform one signal readout operation and one voltage reset operation. The overall readout time may be larger than T (such as 2T).

Figure 6:
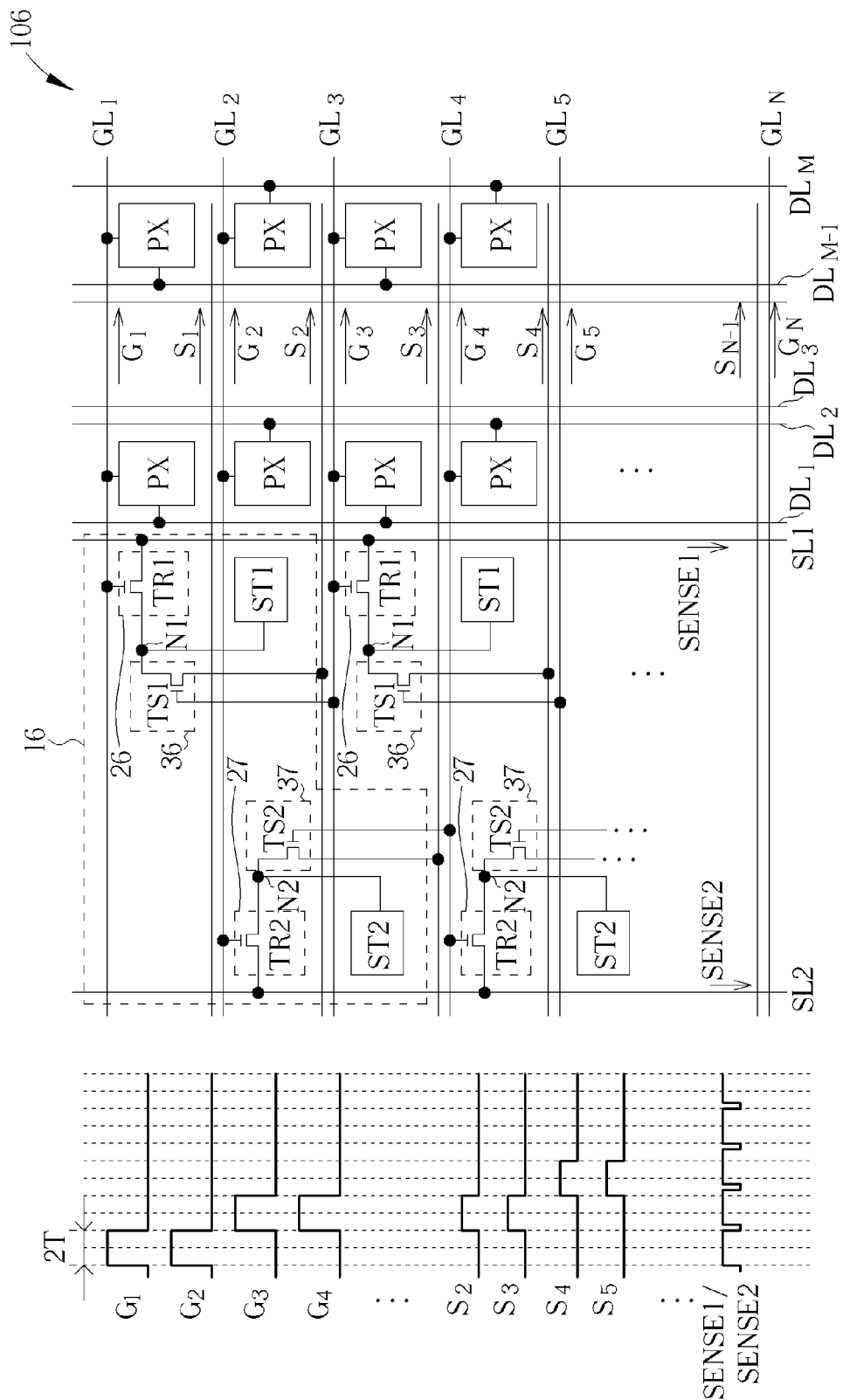

In the embodiment demonstrated on the right side of FIG. 6, each column of pixels is arranged to receive pixel voltages via two data lines. Each sensing unit 16 includes two signal readout lines SL1-SL2, two storage units ST1-ST2, two readout units 26-27, and two reset units 36-37. The storage units ST1 and ST2 are respectively coupled to detecting nodes N1 and N2 for storing the voltage level of the detecting nodes N1 and N2. The readout unit 26 includes a transistor TR1 having a first end coupled to the signal readout line SL1, a second end coupled to the detecting node N1, and a control end coupled to a corresponding gate line $GL_i$ among the gate lines $GL_1$-$GL_N$ (i is an integer between 1 and N). The readout unit 27 includes a transistor TR2 having a first end coupled to the signal readout line SL2, a second end coupled to the detecting node N2, and a control end coupled to a corresponding gate line $GL_{i+1}$ among the gate lines $GL_1$-$GL_N$. The reset unit 36 includes a transistor TS1 having a first end coupled to the detecting node N1, a second end for receiving a reset signal $S_{i+1}$, and a control end coupled to a corresponding gate line $GL_{i+2}$ among the gate lines $GL_1$-$GL_N$. The reset unit 37 includes a transistor TS2 having a first end coupled to the detecting node N2, a second end for receiving a reset signal $S_{i+2}$, and a control end coupled to a corresponding gate line $GL_{i+3}$ among the gate lines $GL_1$-$GL_N$. The signal readout line SL1 is arranged to receive the voltage level of the detecting node N1 via the readout unit 26 and transmit a corresponding sensing signal SENSE1. The signal readout line SL2 is arranged to receive the voltage level of the detecting node N2 via the readout unit 27 and transmit a corresponding sensing signal SENSE2. Before a sensing period ends, the reset units 36 and 37 are configured to reset the voltage level of the storage unit ST, which may thus perform signal readout operation during the next sensing period by storing the voltage level of the detecting node N.

On the left side of FIG. 6 is a timing diagram illustrating the operation of the touch-sensing display panel module 106. Gate control signals $G_1$-$G_N$ are provided for activating and refreshing the pixels coupled to the gate lines $GL_1$-$GL_N$ sequentially. The enable period of each gate control signal is larger than a pixel refresh period T (the duration each time a pixel is being refreshed). The enable period of each gate control signal is completely overlapped with the enable period of at least another gate control signal. During the enable period of the gate control signal $G_i$, the signal readout line SL1 may receive the voltage level of the detecting node N1 via the transistor TR1, and the reset unit 36 may reset the corresponding storage unit ST via the transistor TS1; during the enable period of the gate control signal $G_{i+1}$, the signal readout line SL2 may receive the voltage level of the detecting node N2 via the transistor TR2, and the reset unit 36 may reset the corresponding storage unit ST via the transistor TS1.

For example, for the transistor TR1 whose gate is coupled to the gate line $GL_1$, the signal readout line SL1 is arranged to receive the voltage level of the detecting node N1 via the transistor TR1 during the enable period of the gate control signal $G_1$; for the transistor TR2 whose gate is coupled to the gate line $GL_2$, the signal readout line SL2 is arranged to receive the voltage level of the detecting node N2 via the transistor TR2 during the enable period of the gate control signal $G_2$; for the transistors TR1 and TS1 whose gates are coupled to the gate line $GL_3$, the signal readout line SL1 is arranged to receive the voltage level of the detecting node N1 via the transistor TR1 during the enable period of the gate control signal $G_3$, and the transistor TS1 is arranged to reset the corresponding storage unit ST during the enable period of the gate control signal $G_3$; for the transistors TR2 and TS2 whose gates are coupled to the gate line $GL_4$, the signal readout line SL2 is arranged to receive the voltage level of the detecting node N2 via the transistor TR2 during the enable period of the gate control signal $G_4$, and the transistor TS2 is arranged to reset the corresponding storage unit ST during the enable period of the gate control signal $G_4$; and the readout units 26-27 and the reset units 36-37 coupled to other gate lines may operate in the same manner as described above. Therefore, during a sensing period of the touch-sensing display panel module 106 according to the sixth embodiment of the present invention, the sensing unit 16 is configured to perform one signal readout operation and one voltage reset operation. The overall readout time and the rest time may be larger than T (such as 2T).

Figure 7A:
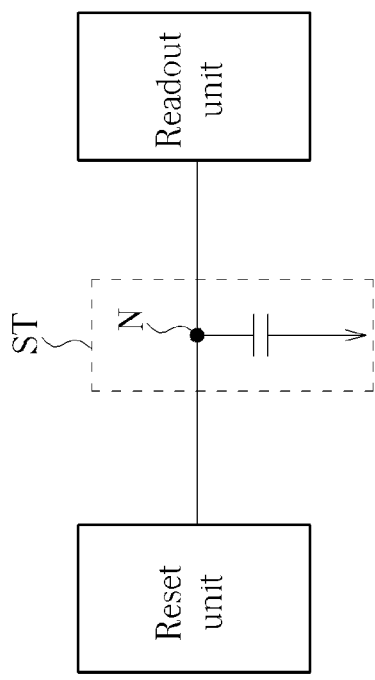
FIGS. 7A-7C are diagrams illustrating embodiments of a capacitive storage unit.
Figure 7C:
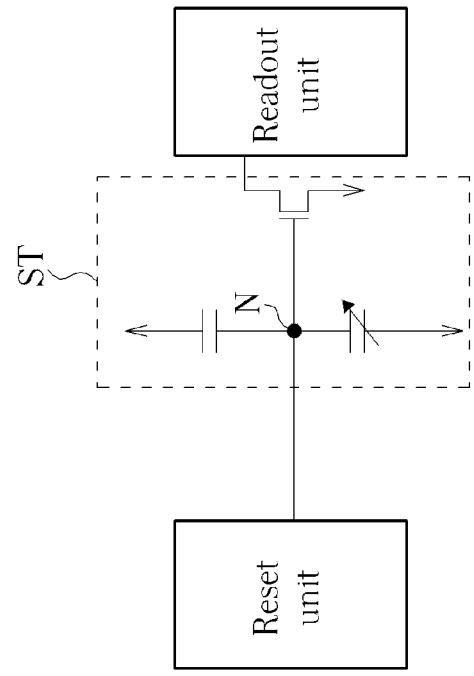
Figure 7B:
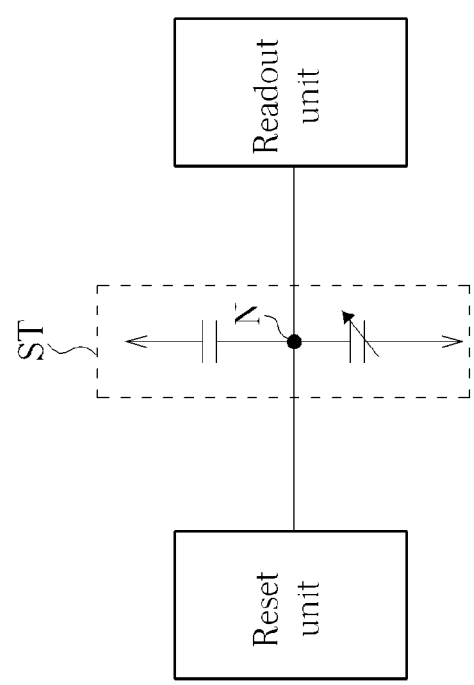

In the embodiments of the present invention, the storage units ST, ST1 and ST2 may include a capacitive device, a photo device, a resistive device or a voltage-sensing device which may store the variations in capacitance, luminance, resistance or voltage caused by touch events. FIGS. 7A-7C are diagrams illustrating embodiments of capacitive storage unit, but do not limit the scope of the present invention.

In the embodiments illustrated in FIGS. 1-6, the transistors TR1 and TR2 may be TFT switches or other devices having similar functions, the transistors TS1 may be photo transistor switches, and the transistors TS2 may be TFT switches or photo transistor switches. However, the above-mentioned devices are only embodiments and do not limit the scope of the present invention.

In the embodiments of the present invention, the sensing units may be disposed on the same side of the pixel array, on both sides of the pixel array, or in the pixel array. The arrangement of the sensing units 11-16 in FIGS. 1-6 are for illustrative purposes and do not limit the scope of the present invention.

In conclusion, the present invention provides an in-cell type touch-sensing display panel module which adopts multiple readout units, adopting multiple reset units or increases the enable period of the gate driving signals. The overall readout time and the rest time may be larger than one pixel refresh period, thereby improving the sensing ability of the touch-sensing display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch-sensing display panel module, comprising:
   a plurality of pixels;
   a plurality of gate lines respectively coupled to the pixels and arranged to provide a plurality of gate control signals for controlling a refresh operation of the plurality of pixels;
   a plurality of data lines respectively coupled to the pixels for providing pixel voltages; and
   a sensing unit, comprising:
      a signal readout line;
      a storage unit coupled to a detecting node;
      a readout unit coupled between the detecting node and the signal readout line, wherein the signal readout line is arranged to receive a voltage level of the detecting node via the readout unit; and
      a reset unit coupled to the detecting node and arranged to reset the storage unit during a sensing period, wherein: the signal readout line is arranged to receive the voltage level of the detecting node via the readout unit; and
      a time span when the reset unit resets the storage unit between two successive refresh operations of an identical pixel among the plurality of pixels is larger than a time span of one of the two successive refresh operations of the identical pixel.

2. The touch-sensing display panel module of claim 1, wherein:
   the readout unit includes a first transistor having:
      a first end coupled to the signal readout line;
      a second end coupled to the detecting node; and
      a control end coupled to a first gate line among the plurality of gate lines for receiving a gate control signal from the first gate line;
   the reset unit includes:
      a second transistor configured to modulate a voltage of the detecting node and having:
         a first end coupled to the detecting node;
         a second end for receiving a first reset signal; and
         a control end coupled to a second gate line among the plurality of gate lines for receiving a gate control signal from the second gate line; and a third transistor configured to modulate the voltage of
the detecting node and having:
a first end coupled to the detecting node;
a second end for receiving a second reset signal; and
a control end coupled to a third gate line among the
plurality of gate lines for receiving a gate control
signal from the third gate line.

3. The touch-sensing display panel module of claim 2, wherein, the gate control signals provided by the first gate line, the second gate line and the third gate line are sequentially enabled for refreshing pixels coupled to the first gate line, the second gate line and the third gate line, respectively.

4. The touch-sensing display panel module of claim 3, wherein:
the reset unit is configured to reset the storage unit via the second transistor when the gate control signal provide by the second gate line is enabled; and
the reset unit is configured to reset the storage unit via the third transistor when the gate control signal provide by the third gate line is enabled.

5. The touch-sensing display panel module of claim 2, wherein the second transistor is a photo transistor switch and the third transistor is a photo transistor switch or a thin film transistor switch.

6. The touch-sensing display panel module of claim 1, wherein:
the readout unit includes:
a first transistor having:
a first end coupled to the signal readout line;
a second end coupled to the detecting node; and
a control end coupled to a first gate line among the plurality of gate lines for receiving a gate control signal from the first gate line; and
a second transistor having:
a first end coupled to the signal readout line;
a second end coupled to the detecting node; and
a control end coupled to a second gate line among the plurality of gate lines for receiving a gate control signal from the second gate line; and
the reset unit includes:
a third transistor configured to modulate a voltage of the detecting node and having:
a first end coupled to the detecting node;
a second end for receiving a first reset signal; and
a control end coupled to a third gate line among the plurality of gate lines for receiving a gate control signal from the third gate line; and
a fourth transistor configured to modulate the voltage of the detecting node and having:
a first end coupled to the detecting node;
a second end for receiving a second reset signal; and
a control end coupled to a fourth gate line among the plurality of gate lines for receiving a gate control signal from the fourth gate line.

7. The touch-sensing display panel module of claim 6, wherein the gate control signals provided by the first gate line, the second gate line, the third gate line and the fourth gate line are sequentially enabled for refreshing pixels coupled to the first gate line, the second gate line, the third gate line and the fourth gate line, respectively.

8. The touch-sensing display panel module of claim 7, wherein:
the reset unit is configured to reset the storage unit via the third transistor when the gate control signal provide by the third gate line is enabled; and
the reset unit is configured to reset the storage unit via the fourth transistor when the gate control signal provide by the fourth gate line is enabled.

9. The touch-sensing display panel module of claim 8, wherein the first transistor is a thin film transistor switch, the second transistor is a thin film transistor switch, the third transistor is a photo transistor switch, and the fourth transistor is a photo transistor switch or a thin film transistor switch.

10. The touch-sensing display panel module of claim 1, wherein:
the readout unit includes a first transistor having:
a first end coupled to the signal readout line;
a second end coupled to the detecting node; and
a control end coupled to a sensing scan line for receiving a readout control signal;
the reset unit includes a second transistor having:
a first end coupled to the detecting node;
a second end for receiving a first reset signal; and
a control end coupled to a second gate line among the plurality of gate lines for receiving a gate control signal from the second gate line; and
the gate control signal provided by the second gate line is enabled for refreshing pixels coupled to the second gate line;
the signal readout line is arranged to receive the voltage level of the detecting node via the first transistor in response to enablement of the sensing scan line; and
an enable period of the sensing scan line is larger than a refresh period of the gate control signals provided by the plurality of the gate lines.

11. The touch-sensing display panel module of claim 1, wherein the storage unit includes a capacitive device, an optical device, a resistive device or a voltage-sensing device.

12. A method for driving a touch-sensing display panel module, comprising:
refreshing a first row of pixels and controlling a sensing unit according to a first gate control signal during a first period for allowing a first signal readout line to receive a sensing signal from the sensing unit;
refreshing a second row of pixels and resetting a storage unit of the sensing unit according to a second gate control signal during a second period subsequent to the first period;
refreshing a third row of pixels and resetting the storage unit of the sensing unit according to a third gate control signal during the second period; and
refreshing the first row of pixels again and controlling the signal readout line to receive the sensing signal from the sensing unit according to a fourth gate control signal during a third period subsequent to the second period, wherein:
a total length of a reset time span when the storage unit of the sensing unit is reset during the first period and the second period is larger than a refresh time span when the first row of pixels is refreshed during the first period.

13. The method of claim 12, further comprising:
the sensing unit providing the sensing signal via the storage unit;
controlling a first transistor of the sensing unit according to the first gate control signal during the first period for receiving the sensing signal by coupling the signal readout line to the storage unit;
controlling a second transistor of the sensing unit according to the second gate control signal during the second period for resetting the storage unit; and controlling a third transistor of the sensing unit according to the third gate control signal during the second period for resetting the storage unit.

14. The method of claim 12, further comprising:

the sensing unit providing the sensing signal via the storage unit;

controlling a first transistor of the sensing unit according to the first gate control signal during the first period for receiving the sensing signal by coupling the signal readout line to the storage unit;

controlling a second transistor of the sensing unit according to the second gate control signal during the second period for resetting the storage unit;

controlling a third transistor of the sensing unit according to the third gate control signal during the second period for resetting the storage unit; and controlling a fourth transistor of the sensing unit according to the fourth gate control signal during a fourth period subsequent to the third period for receiving the sensing signal by coupling the signal readout line to the storage unit.

* * * * *

UNITED STATES PATENT AND TRADEMARK OFFICE
CERTIFICATE OF CORRECTION

PATENT NO. : 10,019,101 B2  
APPLICATION NO. : 14/943033  
DATED : July 10, 2018  
INVENTOR(S) : Hsueh-Ying Huang Page 1 of 1

It is certified that error appears in the above-identified patent and that said Letters Patent is hereby corrected as shown below:

On the Title Page

Item "(*) Notice," reading:  
(*) Notice: Subject to any disclaimer, the term of this patent is extended or adjusted under 35 U.S.C. 154(b) by 184 days.

Should read as follows:  
-- (*) Notice: Subject to any disclaimer, the term of this patent is extended or adjusted under 35 U.S.C. 154(b) by 184 days.

This patent is subject to a terminal disclaimer. --

Signed and Sealed this  
Thirteenth Day of November, 2018

Andrei Iancu  
*Director of the United States Patent and Trademark Office*